(12) United States Patent
Adrian

(10) Patent No.: US 9,679,600 B2
(45) Date of Patent: Jun. 13, 2017

(54) MECHANICAL PRE-FETCHING OF COLD STORAGE MEDIA

(71) Applicant: Facebook, Inc., Menlo Park, CA (US)

(72) Inventor: Jason David Adrian, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/968,611

(22) Filed: Dec. 14, 2015

(65) Prior Publication Data

US 2017/0018287 A1    Jan. 19, 2017

Related U.S. Application Data

(60) Provisional application No. 62/191,939, filed on Jul. 13, 2015.

(51) Int. Cl.
| | | |
|---|---|---|
| *G11B 17/22* | (2006.01) | |
| *G11B 15/58* | (2006.01) | |
| *G11B 15/68* | (2006.01) | |

(52) U.S. Cl.
CPC .......... *G11B 17/22* (2013.01); *G11B 15/6835* (2013.01); *G11B 17/225* (2013.01)

(58) Field of Classification Search
CPC .... G11B 17/225; G11B 15/6835; G11B 17/22
See application file for complete search history.

(56) References Cited

U.S. PATENT DOCUMENTS

| | | | | |
|---|---|---|---|---|
| 6,233,697 B1* | 5/2001 | Yamamoto | .......... | G06F 11/1092 714/5.1 |
| 6,785,078 B2* | 8/2004 | Basham | ................ | G06F 3/0601 360/69 |
| 7,855,938 B2* | 12/2010 | Hoelsaeter | ......... | G11B 15/6835 369/30.4 |
| 8,514,513 B2* | 8/2013 | Hori | ................... | G11B 15/6835 360/92.1 |
| 8,549,237 B2* | 10/2013 | Evans | ................. | G11B 15/689 711/100 |
| 8,873,360 B2* | 10/2014 | Minemura | ............. | G11B 33/04 369/75.11 |
| 9,196,290 B2* | 11/2015 | Hashimoto | ........ | G11B 15/6835 |
| 2009/0296541 A1* | 12/2009 | Hashimoto | ........ | G11B 15/6845 369/36.01 |

* cited by examiner

*Primary Examiner* — Thomas Randazzo
(74) *Attorney, Agent, or Firm* — Perkins Coie LLP

(57) ABSTRACT

Some embodiments include a cold storage system that processes an input/output (I/O) request. The cold storage system can have a buffer rack and one or more archival storage racks. The buffer rack can be closer to an I/O drive of the cold storage system than the archival storage racks. The cold storage system can operate a fetcher robot to pre-fetch a first data storage medium from the archival storage racks to the buffer rack. The cold storage system can operate a buffer robot to move a second data storage medium from a slot in the buffer rack to the I/O drive. The cold storage system can execute, according to the I/O request, an I/O operation on the second data storage medium at the I/O drive.

18 Claims, 6 Drawing Sheets

MECHANICAL PRE-FETCHING OF COLD STORAGE MEDIA

CROSS-REFERENCE TO RELATED APPLICATION(S)

This application claims the benefit of U.S. Provisional Patent Application No. 62/191,939, entitled "MECHANICAL PRE-FETCHING OF COLD STORAGE MEDIA," filed on Jul. 13, 2015, which is incorporated by reference herein in its entirety.

BACKGROUND

A tertiary data storage system is a data storage system that stores data in a medium that is not directly under the control of a processing unit, but is accessible via mechanical means of mounting the medium to an input/output device ("I/O drive") of the processing unit. Tertiary storage or tertiary memory provides a third level of storage (e.g., aside from primary storage that is directly accessible to the processing unit and secondary storage that is indirectly accessible to the processing unit through a staging area). Typically, tertiary data storage involves a robotic mechanism which can insert or remove mass storage media into or from an I/O drive according to a storage system's demands. Traditionally, tertiary data storage is used for archiving rarely accessed information since it is much slower than secondary storage (e.g., 5-60 seconds vs. 1-10 milliseconds). This is primarily useful for extraordinarily large data stores that are accessed without human operators. Examples include tape libraries and optical jukeboxes.

In a conventional tertiary data storage architecture, when a computer needs to read information from the tertiary storage, it can consult a catalog database to determine which data storage medium (e.g., tape or disc) contains the information. Next, the computer can instruct a robotic arm to fetch the medium and place it in an I/O drive. When the computer has finished reading the information, the robotic arm can return the medium to its assigned place in a "library" of the tertiary storage.

Tertiary storage can be considered a form of cold storage. The medium is recorded, and then physically removed or disconnected. For example, the medium can be an optical disc (e.g., Blu-Ray™ disc, a compact disc (CD), a digital versatile disc (DVD), Archival Disc™ (AD), or any combination thereof). Tertiary storage can be used as a last resort data backup. In case of a disaster, for example a fire, destroys the original data, a medium in a remote location is probably unaffected, enabling disaster recovery. The off-line nature of the data storage medium increases general information security, since it is physically inaccessible from a computer when not connected to the I/O drive, and data confidentiality or integrity cannot be affected by computer-based attack techniques. Also, if the information stored for archival purposes is rarely accessed, off-line storage is less expensive than other forms of data storage. Nevertheless, the long delays associated with using tertiary data storage remains a challenge, and discourages people from implementing them for mass data applications.

Figure 1:
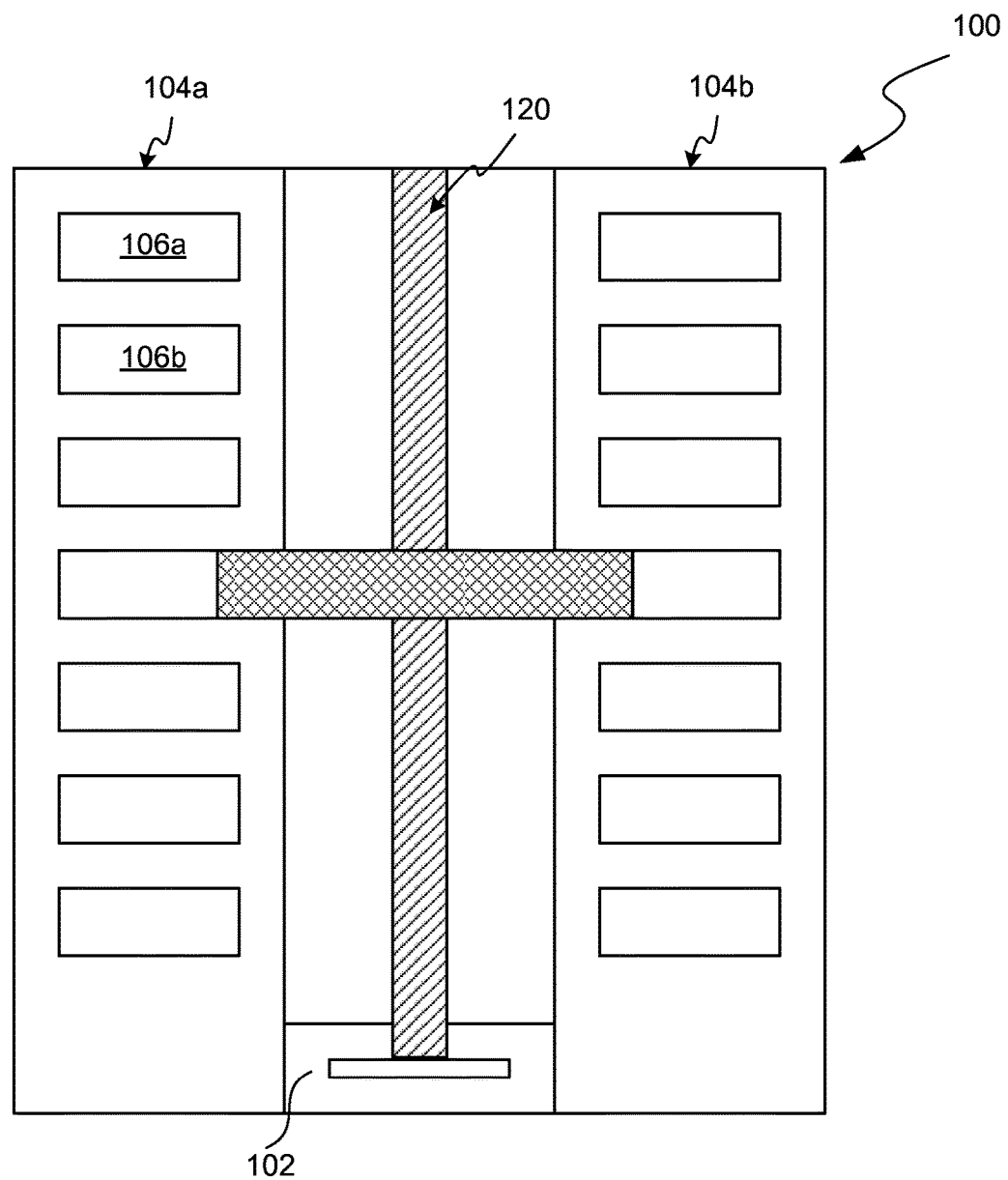
FIG. 1 is diagrammatic cross-section of an example of a conventional optical jukebox.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Several embodiments include a cold storage system. The cold storage system is a computer data storage (e.g., a tertiary data storage). The cold storage system can utilize robotics to move one or more off-line data storage media (e.g., optical discs or tapes) to an I/O drive for data access. In some embodiments, the cold storage system can facilitate I/O access to more than one type of off-line data storage media (e.g., Blu-ray discs, ADs, DVDs, CDs, magnetic tapes, or any combination thereof). In several embodiments, the cold storage system can include a buffer rack having slots to store multiple data storage media. The buffer rack can include or be adjacent to the I/O drive. For example, the buffer rack can be the closest rack to the I/O drive in an enclosure of the cold storage system. The cold storage system can also include one or more archival storage racks having cells to store multiple data storage media or containers of data storage media. In some embodiments, the cells can be adapted with the same structure as the slots.

The slots in the buffer rack can store one or more blank data storage media, one or more retrieved data storage media to be accessed, one or more recently accessed data storage media prior to re-shelving, or any combination thereof. A buffer robot can be within or coupled to the buffer rack. The movement of the buffer robot can be limited within the buffer rack. In some embodiments, where the I/O drive is outside of the buffer rack, the movement of the buffer robot can be limited to be between the buffer rack and the I/O drive or within the buffer rack (e.g., in the case that the I/O drive is in the buffer rack). The buffer robot can be configured to move a data storage medium to or from the I/O drive. In one example, the buffer robot can move a data storage medium from the I/O drive to a slot in the buffer rack (e.g., by inserting into an empty slot or replacing content within the slot). In another example, the buffer robot can move a data storage medium from a slot in the buffer rack to the I/O drive (e.g., by inserting into an idling I/O drive or replacing a current medium engaged with the I/O drive).

The cold storage system can include a fetcher robot configured to move amongst all of the racks. In one example, when the I/O drive is executing a write request involving multiple write operations on multiple blank data storage media (e.g., when the buffer rack would run out of blank data storage media), the fetcher robot can fetch one or more blank data storage media from an archival storage rack back to one or more slots in the buffer rack. Concurrently, the buffer robot can swap in a blank data storage medium into the I/O drive whenever the I/O drive finishes a write operation on a data storage medium therein (e.g., the data storage medium becomes full prior to fulfilling the write request). The buffer robot can also remove the data storage medium from the I/O drive when the I/O drive finishes the write operation on the data storage medium. For example, the buffer robot can place the recently removed data storage medium in a slot in the buffer rack. In some embodiments, the buffer rack includes a designated area to store blank data storage media. In some embodiments, the buffer rack includes a designated area to store data storage media to be re-shelved (e.g., recently written data storage media).

In another example, when the I/O drive is responding to a read request involving multiple read operations on multiple data storage media, the fetcher robot can fetch one or more requested data storage media from an archival storage rack back to one or more slots in the buffer rack. Concurrently, the buffer robot can swap a requested data storage medium after another into the I/O drive for data extraction. The buffer robot can also remove the requested data storage medium from the I/O drive when the I/O drive finishes the read operation on the data storage medium. For example, the buffer robot can place the recently removed data storage medium in a slot in the buffer rack. In some embodiments, the buffer rack includes a designated area to store requested data storage media pending read operations. In some embodiments, the buffer rack includes a designated area to store data storage media to be re-shelved (e.g., recently read data storage media). In some embodiments, the designated areas for data storage media pending read operations or write operations can be closer to the I/O drive than the designated areas for data storage media that have been removed from the I/O drive for temporary storage before being archived into an archival storage rack.

In several embodiments, the concurrent operations of the buffer robot and the fetcher robot enable the cold storage system to continuously load data storage media, one after another, into the I/O drive with minimized gap(s) therebetween. This can advantageously reduce the amount of time the I/O drive needs to wait between its operations on different data storage media. Unlike conventional optical jukeboxes, these embodiments have the buffer robot specialized in swapping data storage medium in and out of the I/O drive to a nearby buffer rack slot. The fetcher robot can be specialized to deliver data storage media to and from archival storage racks that are farther away from the I/O drive than the buffer rack.

Referring now to the figures, FIG. 1 is diagrammatic cross-section of an example of a conventional optical jukebox 100. The conventional optical jukebox 100 includes an I/O drive 102. The I/O drive 102 is adapted to read data from an optical disc (e.g., a CD, a DVD, or a Blu-ray disc). The I/O drive 102 can also be configured to write data to an optical disc. The I/O drive 102, for example, can be an optical disc reader and writer.

The conventional optical jukebox 100 can include a first rack 104A and a second rack 104B. Each rack can include several slots for holding optical discs. For example, the first rack 104A can include a first slot 106A and a second slot 106B. Whenever the conventional optical jukebox 100 receives a read command for the I/O drive 102 to extract data from an optical disc, a jukebox loader robot 120 can retrieve an optical disc from either the first rack 104A or the second rack 104B. Whenever the conventional optical jukebox 100 receives a write command, the jukebox loader robot 120 can move a blank disc in either the first rack 104A or the second rack 104B to the I/O drive 102.

Figure 2:
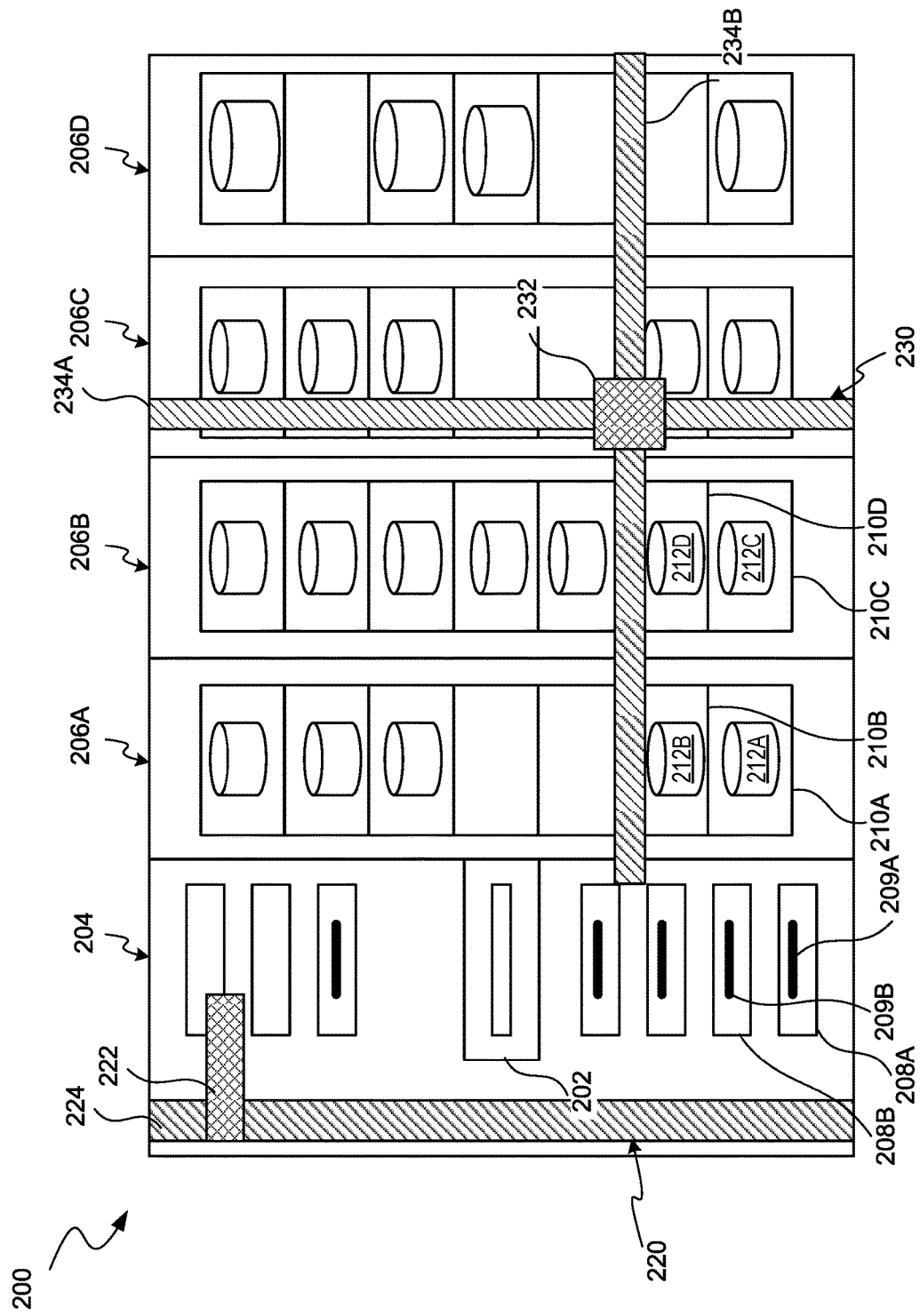
FIG. 2 is diagrammatic cross-section of a cold storage system, in accordance with various embodiments.

FIG. 2 is diagrammatic cross-section of a cold storage system 200, in accordance with various embodiments. The cold storage system 200 includes an I/O drive 202. The I/O drive 202 can be configured to read data from a data storage medium (e.g., a CD, a DVD, a Blu-ray disc, an AD disc, a magnetic tape, etc.). The I/O drive 202 can also be configured to write data to a data storage medium. In some embodiments, the I/O drive 202 is an optical disc reader and writer. In some embodiments, the I/O drive 202 can include sub-components (e.g., a reader component, a writer component, a Blu-ray disc drive component, and an AD disc drive component, or any combination thereof).

The cold storage system 200 can include multiple racks for physically storing data storage media. In some embodiments, the data storage media include or are optical discs. The racks can be adapted to store multiple types of data storage media and the I/O drive 202 can be adapted to read from and write in the multiple types of data storage media.

The cold storage system 200 can include a buffer rack 204 that is closer in proximity to the I/O drive 202 than all the other racks (e.g., one or more archival storage racks). The I/O drive 202 can be coupled to or in the buffer rack 204. The I/O drive 202 can be attached to the center of the buffer rack (e.g., to minimize delivery distance from a slot in the buffer rack 204 to the I/O drive 202). The archival storage racks can include an archival storage rack 206A, an archival storage rack 206B, an archival storage rack 206C, and an archival storage rack 206D (collectively as the "archival storage racks 206").

In some embodiments, the buffer rack 204 includes slots (e.g., a slot 208A, a slot 208B, etc., collectively as the "slots 208") for holding individual data storage media (e.g., a data storage medium 209A and a data storage medium 209B). In some embodiments, each of the slots 208 is adapted to hold a container storing multiple data storage media. In some embodiments, the archival storage racks 206 can include cells (e.g., a cell 210A, a cell 210B, a cell 210C, and a cell 210D, collectively as the "cells 210") to hold containers (e.g., a media container 212A, a media container 212B, a media container 212C, and a media container 212D, collectively as the "media containers 212") of data storage media. For example, the archival storage rack 206A can include the cell 210A, the cell 210B, etc.; and the archival storage rack 206B can include the cell 210C, the cell 210D, etc. In some embodiments, instead of holding the media containers 212, each of the cells 210 can hold an individual data storage medium. The media containers 212 can be, for example, a spindle, a stack, a box, or any combination thereof.

A buffer robot 220 can be adapted to mechanical deliver a data storage medium to or from the I/O drive 202 within or along the buffer rack 204. In some embodiments, the buffer robot 220's movements are restricted to be along the buffer rack 204 and/or between the buffer rack 204 and the I/O drive 202. In some embodiments, the buffer robot 220 can be within the buffer rack 204. In some embodiments, the buffer robot 220 can be coupled adjacent to the buffer rack 204 such that the buffer robot 220 can access each of the slots 208. In some embodiments, the buffer robot 220 can move along a single dimension (e.g., up or down as illustrated). In some embodiments, the buffer robot 220 can move along two or more dimensions (e.g., up or down and forward or backward).

In some embodiments, the buffer robot 220 can include a mechanical arm 222 that can move (e.g., slide, roll, shift, or any combination thereof) along a track 224. In some embodiments, the mechanical arm 222 is attached or fixed to the track 224, and the track 224 can move along the buffer rack 204 such that the mechanical arm 222 moves along with it. In some embodiments, where the buffer robot 220 can move along two dimensions, the buffer robot 220 can include multiple tracks. A control circuitry (e.g., illustrated as functional components in FIG. 3) can control the movement of the buffer robot 220.

A fetcher robot 230 can be adapted to mechanically deliver a data storage medium or a media container between one of the archival storage racks 206 and the buffer rack 204. The fetcher robot 230 can be adapted to move among the buffer rack 204 and the archival storage racks 206. In some embodiments, the fetcher robot 230 is adapted with one or more mechanisms to open or otherwise access a media container. For example, the fetcher robot 230 can be configured to open or access a media container to insert a data storage medium into the media container. In another example, the fetcher robot 230 can be configured to open or access a media container to remove a data storage medium therefrom. In embodiments where the buffer rack 204 stores individual data storage media and the archival storage racks 206 store media containers, the mechanisms to open a media container is used either at the buffer rack 204 or at the archival storage racks 206.

In some embodiments, the fetcher robot 230 can move along two dimensions (e.g., up or down and left or right as illustrated). In some embodiments, the fetcher robot 230 can move along three dimensions (e.g., up or down, left or right, and forward or backward). In some embodiments, the fetcher robot 230 can include a mechanical arm 232 that can move (e.g., slide, roll, shift, or any combination thereof) along one or more tracks (e.g., a track 234A and a track 234B, collectively as the "tracks 234"). In some embodiments, the mechanical arm 232 is attached or fixed to the tracks 234, and the tracks 234 can move amongst the buffer rack 204 and the archival storage racks 206 such that the mechanical arm 232 moves along with it. A control circuitry (e.g., illustrated as functional components in FIG. 3) can control the movement of the fetcher robot 230.

When operating the cold storage system 200, at least some of the slots 208 can be empty. For example, the buffer robot 220 can move a data storage medium ejected from the I/O drive 202 to an empty slot in the buffer rack 204 to temporarily store the data storage medium, prior to the fetcher robot 230 moving the data storage medium into one of the media containers 212 in one of the archival storage racks 206. When operating the cold storage system 200, at least some of the cells 210 and/or at least some of the media containers 212 can be empty.

Figure 3:
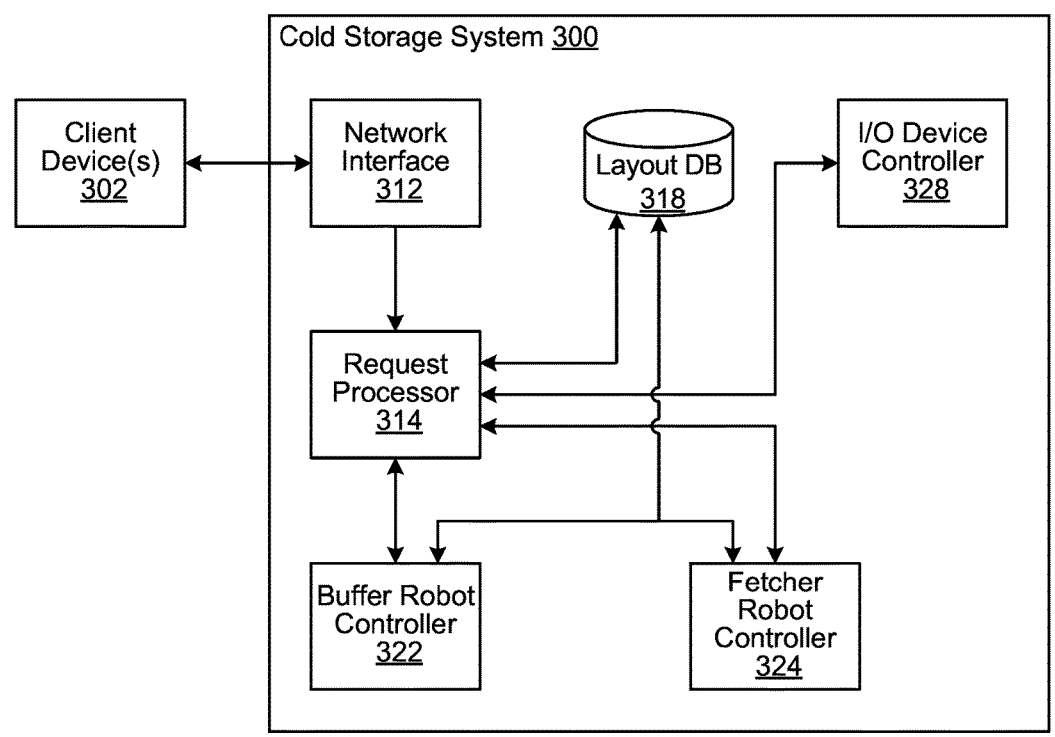
FIG. 3 is a block diagram of a cold storage system, in accordance with various embodiments.

FIG. 3 is a block diagram of a cold storage system 300, in accordance with various embodiments. For example, FIG. 3 can illustrate functional and/or logical components that enable a data storage service to be implemented on the cold storage system 300. The cold storage system 300 can be the cold storage system 200 of FIG. 2. The cold storage system 300 can provide a data storage service for one or more client devices 302. In some embodiments, the cold storage system 300 can provide item-level access (e.g., data objects or files, physical or virtual data volumes, etc.). In some embodiments, the cold storage system 300 can provide block-level access.

The cold storage system 300 can include a network interface 312 that enables the cold storage system 300 to communicate with the client devices 302. For example, the network interface 312 can receive an I/O request (e.g., a write request or a read request from the client devices 302). A request processor 314 can process the I/O request (e.g., to be fulfilled by an I/O drive). The request processor 314 can verify that the cold storage system 300 can fulfill the I/O request and verify that the requesting client is authorized to give the I/O command associated with the I/O request.

The cold storage system 300 can maintain a layout database 318. In some embodiments, the layout database 318 stores a mapping between data objects (e.g., files) and identifiers of the data storage media (e.g., in the buffer rack 204 or one of the archival storage racks 206 of FIG. 2) in the cold storage system 300. In some embodiments, the layout database 318 stores a mapping between identifiers of the data storage media in the cold storage system 300 and rack locations (e.g., which slot in the buffer rack 204, which cell in one of the archival storage racks 206, and/or which one of the media containers 212 of FIG. 2). The request processor 314 can utilize the layout database 318 to identify and locate one or more data storage media that are associated with the I/O request.

When the request processor 314 determines that an identified data storage medium (e.g., a data storage medium containing requested data or a blank data storage medium for storing data payload) associated with an I/O request is not in an I/O drive (e.g., the I/O drive 202 of FIG. 2) of the cold storage system 300, the request processor 314 can communicate with a buffer robot controller 322 and/or a fetcher robot controller 324 to ensure that the identified data storage medium is delivered to the I/O drive. When the identified data storage medium is in an archival storage rack (e.g., one of the archival storage racks 206 of FIG. 2), the fetcher robot controller 324 can operate a fetcher robot (e.g., the fetcher robot 230 of FIG. 2) to move the identified data storage medium or a media container holding the identified data storage medium to the buffer rack. When the identified data storage medium is in a buffer rack (e.g., the buffer rack 204 of FIG. 2), the buffer robot controller 322 can operate a buffer robot (e.g., the buffer robot 220 of FIG. 2) to move the identified data storage medium to the I/O drive when the I/O drive is ready (e.g., finish with any previous operation).

An I/O drive controller 328 can be configured to execute I/O operations on data storage media identified by the request processor 314 as being associated with an I/O request. In one example, in response to a read request spanning across multiple data storage media, the I/O drive controller 328 can extract data from one data storage medium after another, as each data storage medium is loaded into the I/O drive by the buffer robot. For example, the fetcher robot controller 324 can command the fetcher robot to grab the requested data storage media not yet in the buffer rack (e.g., sequentially based on a priority or randomly). In one example, in response to a write request involving a data payload higher than a maximum capacity of a single data storage medium, the I/O drive controller 328 can write portions of the data payload into one data storage medium after another, as each blank data storage medium is loaded into the I/O drive by the buffer robot. For example, the fetcher robot controller 324 can command the fetcher robot to replenish blank data storage media from the archival storage racks to the buffer rack.

Functional components (e.g., engines, modules, and databases) associated with the cold storage system 300 can be implemented as circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). The systems, engines, or devices described may include additional, fewer, or different functional components for various applications.

Figure 4:
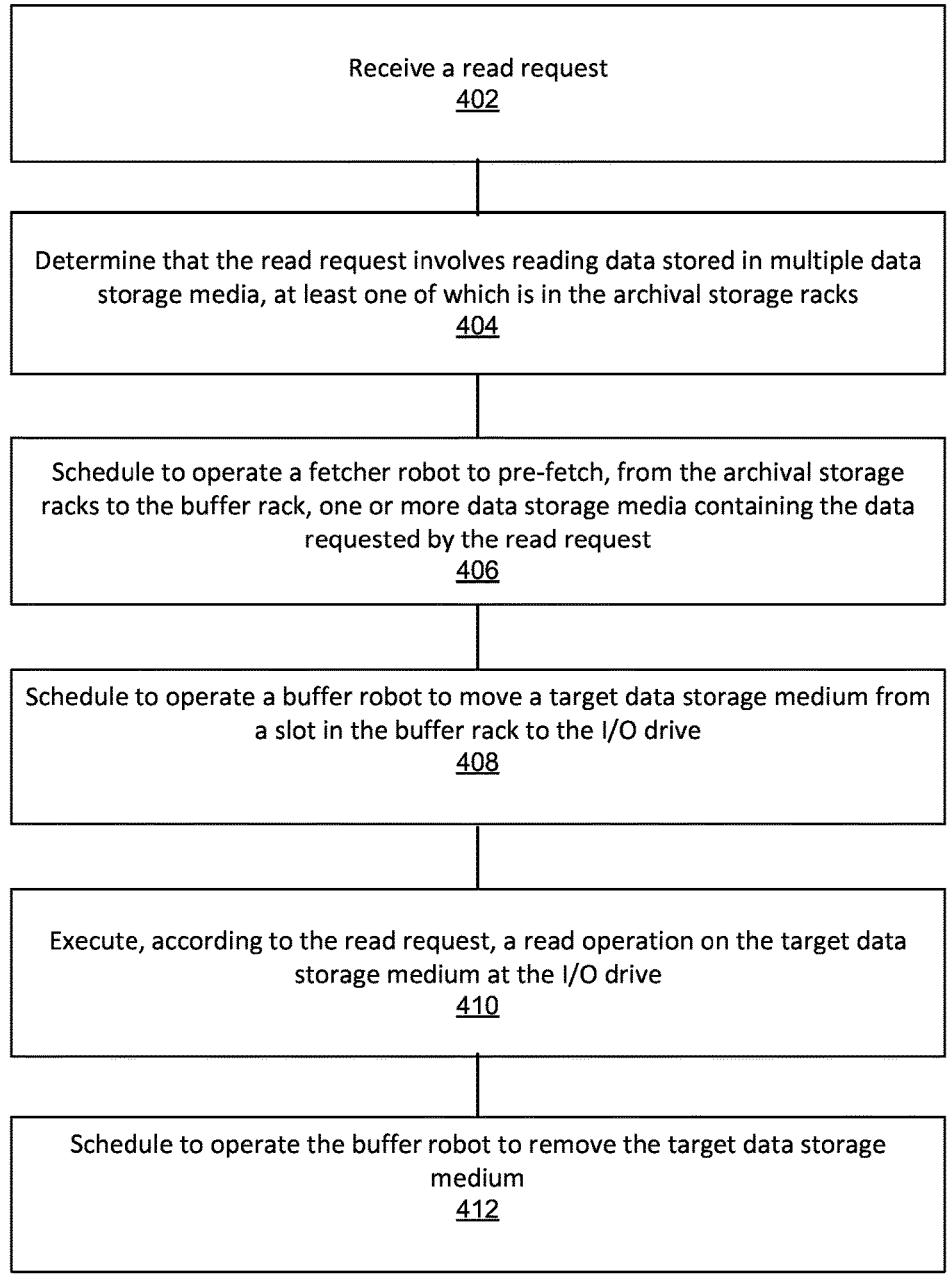
FIG. 4 is a flow chart of a method of operating a cold storage system to respond to a read request, in accordance with various embodiments.

FIG. 4 is a flow chart of a method 400 of operating a cold storage system (e.g., the cold storage system 200 of FIG. 2 and/or the cold storage system 300 of FIG. 3) to respond to a read request, in accordance with various embodiments. The cold storage system can have a buffer rack and one or more archival storage racks. The buffer rack can be closer to an I/O drive of the cold storage system than the archival storage racks. At step 402, the cold storage system can receive the read request. At step 404, the cold storage system can determine that the read request involves reading data stored in multiple data storage media, at least one of which is in the archival storage racks.

At step 406, the cold storage system can schedule to operate a fetcher robot to pre-fetch, from the archival storage racks to the buffer rack, one or more data storage media containing the data requested by the read request. This operation can be scheduled in advance in response to the read request being processed. For example, a request processor of the cold storage system can send a command to a fetcher robot controller. The fetcher robot can be adapted to move between the buffer rack and the archival storage racks. In some embodiments, step 406 is in response to the determination that the read request involves reading the data stored across multiple data storage media. In some embodiments, step 406 is in response to the cold storage system scheduling one or more read operations to fulfill the read request.

At step 408, the cold storage system can schedule to operate a buffer robot to move a target data storage medium from a slot in the buffer rack to the I/O drive. This operation can be scheduled in advance in response to the read request being processed. The buffer robot can be adapted to move between one or more slots in the buffer rack and the I/O drive. In some embodiments, the movement of the buffer robot is restricted to be only between the slots in the buffer rack and between the slots and the I/O drive. Step 408 can be in response to the cold storage system scheduling the one or more read operations. In several embodiments, step 406 and step 408 can be scheduled to operate independently of each other. This enables step 406 and step 408 to concurrently operate from time to time, preventing the need for the I/O drive to wait for the retrieval of a requested data storage medium from an archival storage rack whenever it finishes its current I/O operation. At step 410, the cold storage system can execute, according to the read request, a read operation on the target data storage medium at the I/O drive.

In some embodiments, the cold storage system can schedule the buffer robot to load one data storage medium after another from the buffer rack to the I/O drive (e.g., by repeating step 408) to fulfill a read request involving multiple data storage media. The cold storage system can schedule the fetcher robot to pre-fetch, one after another, from the archival storage racks to the buffer rack, storage media containers containing at least a data storage medium storing the data requested by the read request (e.g., by repeating step 406).

At step 412, the cold storage system can schedule to operate the buffer robot to remove the target data storage medium. This operation can be scheduled (e.g., queued) in response to the read operation being completed. For example, the cold storage system can operate the buffer robot to move the target data storage medium from the I/O drive to a slot (e.g., an empty slot) in the buffer rack, in response to completing the read operation on the data storage medium.

Scheduling to operate the buffer robot to remove the target data storage medium can include designating (e.g., tag) the slot holding the target data storage medium as a "return slot" (e.g., to be returned to the archival storage racks). That is, the cold storage system can schedule to operate the fetcher robot to move the target data storage medium from the return slot in the buffer rack to the archival storage racks. In some embodiments, one or more slots in the buffer rack is pre-designated (e.g., designating prior to receiving the read request) as a temporary holding place whenever a data storage medium is scheduled to return to the archival storage racks (e.g., when the data storage medium is no longer needed for a scheduled I/O operation at the I/O drive). In some embodiments, the cold storage system actively designates one or more slots as a holding place for data storage media that are to be returned to the archival storage racks. In some embodiments, when the fetcher robot brings an incoming data storage medium from the archival storage racks, the fetcher robot can replace content in one of these designated slots with the incoming data storage medium.

Figure 5:
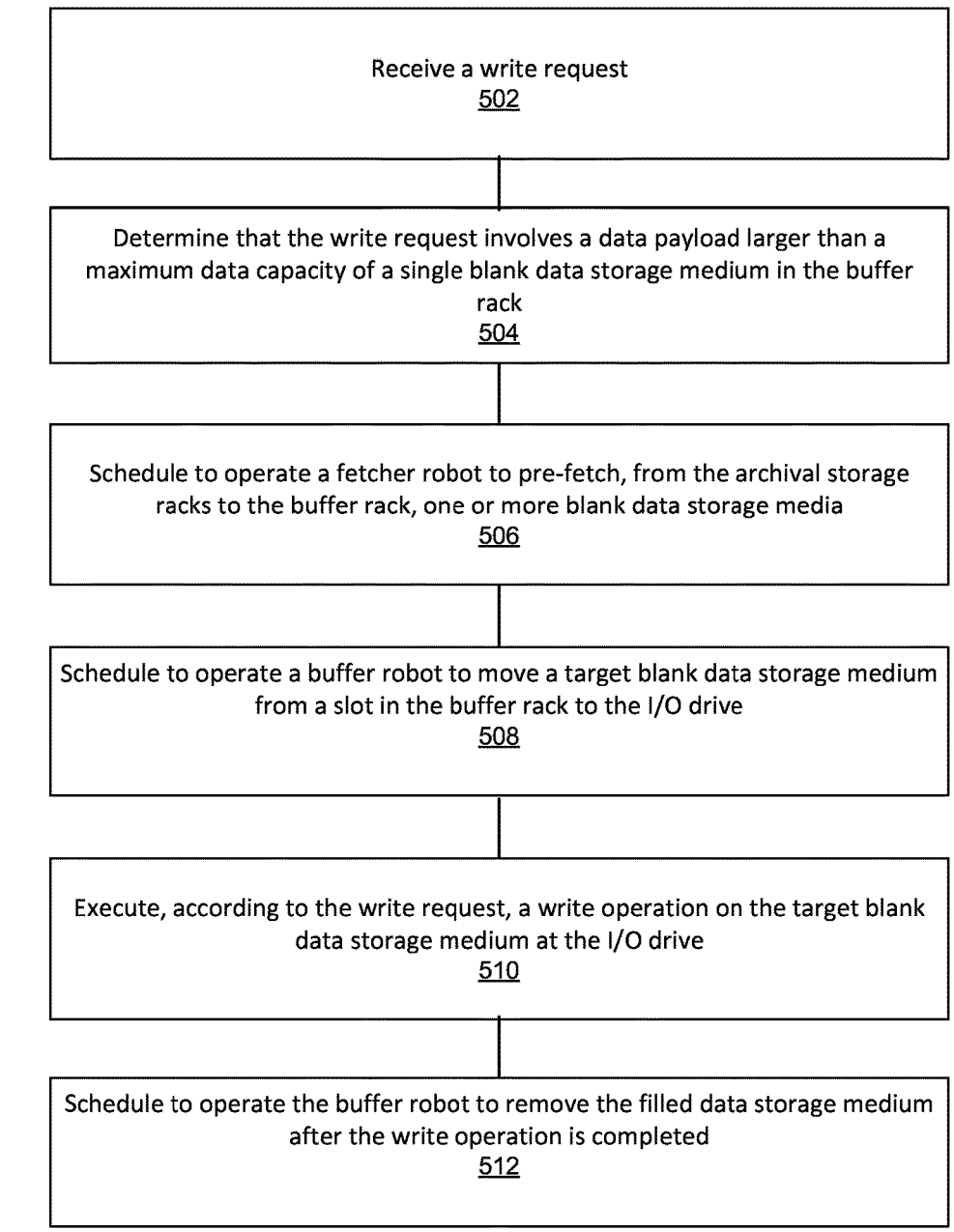
FIG. 5 is a flow chart of a method of operating a cold storage system to respond to a write request, in accordance with various embodiments.

FIG. 5 is a flow chart of a method 500 of operating a cold storage system (e.g., the cold storage system 200 of FIG. 2 and/or the cold storage system 300 of FIG. 3) to respond to a write request, in accordance with various embodiments. The cold storage system can be the same cold storage system executing the method 400 of FIG. 4. At step 502, the cold storage system can receive the write request. At step 504, the cold storage system can determine that the write request involves a data payload larger than a maximum data capacity of a single blank data storage medium in the buffer rack.

At step 506, the cold storage system can schedule to operate a fetcher robot to pre-fetch, from the archival storage racks to the buffer rack, one or more blank data storage media. This operation can be scheduled in advance in response to the write request being processed. For example, a request processor of the cold storage system can send a command to a fetcher robot controller. In some embodiments, step 506 is in response to the determination that the write request would require the capacity of more than one data storage medium. In some embodiments, step 506 is in response to the cold storage system scheduling one or more write operations (e.g., to write in multiple blank data storage media) to fulfill the write request.

At step 508, the cold storage system can schedule to operate a buffer robot to move a target blank data storage medium from a slot in the buffer rack to the I/O drive. This operation can be scheduled in advance in response to the write request being processed. Step 508 can be in response to the cold storage system scheduling the one or more write operations. In several embodiments, step 506 and step 508 can be scheduled to operate independently of each other. This enables step 506 and step 508 to concurrently operate from time to time, preventing the need for the I/O drive to wait for the retrieval of a blank data storage medium from an archival storage rack whenever it finishes its current I/O operation and the buffer rack runs out of blank data storage medium. At step 510, the cold storage system can execute, according to the write request, a write operation on the target blank data storage medium at the I/O drive.

In some embodiments, the cold storage system can schedule the buffer robot to load one blank data storage medium after another from the buffer rack to the I/O drive (e.g., by repeating step 508) to fulfill a write request requiring multiple blank data storage media. The cold storage system can also schedule the fetcher robot to pre-fetch blank data storage medium, one after another, from the archival storage racks to the buffer rack (e.g., by repeating step 506).

At step 512, the cold storage system can schedule to operate the buffer robot to remove the filled data storage medium (i.e., the target blank data storage medium after the write operation) after the write operation is completed. This operation can be scheduled in response to the write operation being completed. For example, the cold storage system can schedule (e.g., queue) the buffer robot to move the filled data storage medium from the I/O drive to a slot (e.g., empty slot) in the buffer rack, in response to completing the write operation on the data storage medium.

Scheduling to operate the buffer robot to remove the filled data storage medium can include designating (e.g., tag) a slot holding the filled data storage medium as to be returned to the archival storage racks. That is, the cold storage system can schedule (e.g., queue) to operate the fetcher robot to move the filled data storage medium from the buffer rack to the archival storage racks.

While processes or blocks are presented in a given order in FIG. 5, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 6:
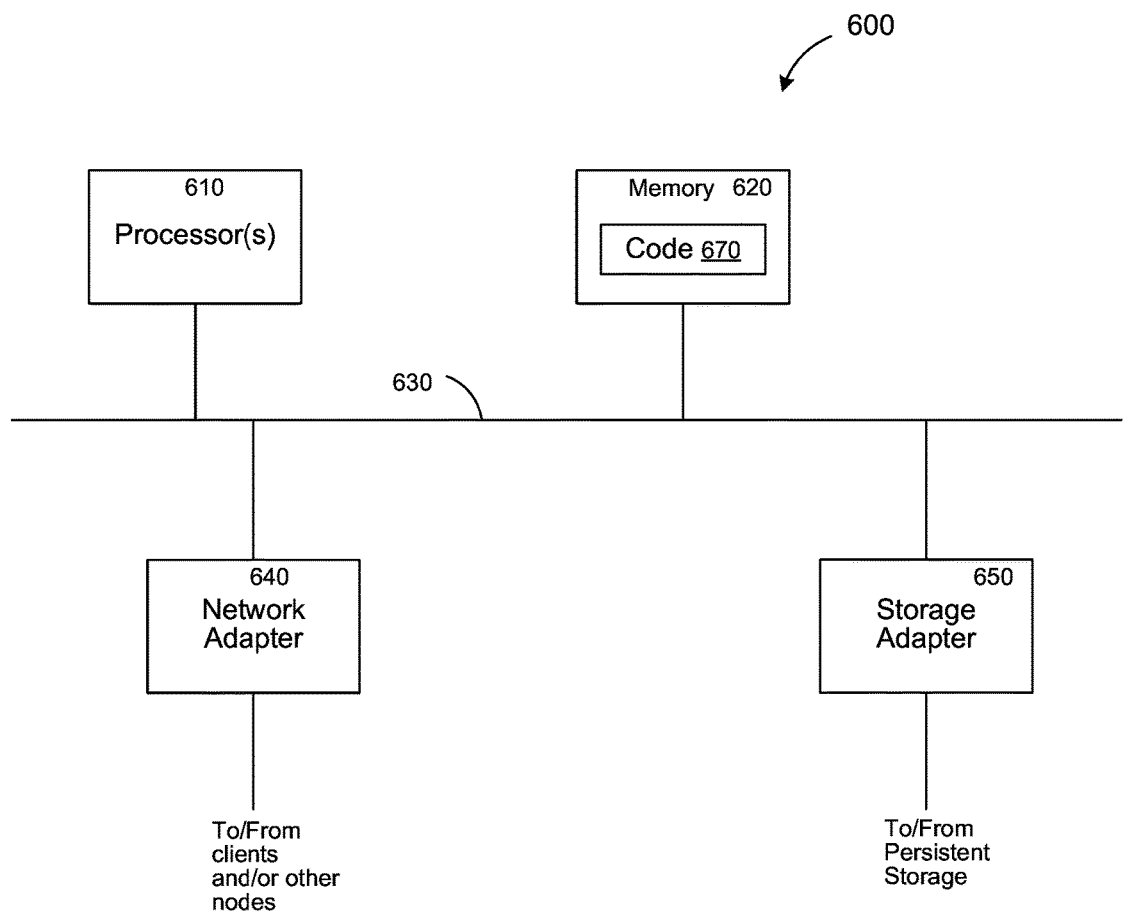
FIG. 6 is a block diagram of an example of a computing device, which may represent one or more computing device or server described herein, in accordance with various embodiments.

FIG. 6 is a block diagram of an example of a computing device 600, which may represent one or more computing device or server described herein, in accordance with various embodiments. The computing device 600 can be one or more computing devices that implement, at least partially, the cold storage system 200, the cold storage system 300, the method 400, the method 500, or any combination thereof. The computing device 600 includes one or more processors 610 and memory 620 coupled to an interconnect 630. The interconnect 630 shown in FIG. 6 is an abstraction that represents any one or more separate physical buses, point-to-point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 610 is/are the central processing unit (CPU) of the computing device 600 and thus controls the overall operation of the computing device 600. In certain embodiments, the processor(s) 610 accomplishes this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computing device 600. The memory 620 represents any form of random access memory (RAM), read-only memory (ROM), flash memory, or the like, or a combination of such devices. In use, the memory 620 may contain a code 670 containing instructions according to the mesh connection system disclosed herein.

Also connected to the processor(s) 610 through the interconnect 630 are a network adapter 640 and a storage adapter 650. The network adapter 640 provides the computing device 600 with the ability to communicate with remote devices, over a network and may be, for example, an Ethernet adapter or Fibre Channel adapter. The network adapter 640 may also provide the computing device 600 with the ability to communicate with other computers. The storage adapter 650 enables the computing device 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the computing device 600 by downloading it from a remote system through the computing device 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/ non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification.

What is claimed is:

1. A method performed by a computing device having a processor and memory, comprising:
   receiving an input/output (I/O) request at a cold storage system having a buffer rack and one or more archival storage racks, wherein the buffer rack is closer to an I/O drive of the cold storage system than the archival storage racks;
   operating a fetcher robot to pre-fetch a first data storage medium from the archival storage racks to the buffer rack, wherein the fetcher robot is adapted to move between the buffer rack and the archival storage racks;
   determining, by the processor, whether the I/O request involves a data size larger than a maximum data capacity of a single data storage medium in the buffer rack;
   in an event the I/O request involves a data size larger than the maximum data capacity of a single data storage medium, operating a buffer robot to move a second data storage medium from a holding slot in the buffer rack to the I/O drive, wherein the buffer robot is adapted to move between one or more slots in the buffer rack and the I/O drive; and
   executing, according to the I/O request, an I/O operation on the second data storage medium at the I/O drive as part of fulfilling the I/O request.

2. The computer-implemented method of claim 1, wherein operating the buffer robot occurs concurrently with operating the fetcher robot.

3. The computer-implemented method of claim 1, wherein the I/O request is a write request; and wherein operating the fetcher robot to pre-fetch includes operating the fetcher robot to pre-fetch, from the archival storage racks to the buffer rack, one or more blank data storage media.

4. The computer-implemented method of claim 1, wherein the I/O request is a read request; and wherein operating the fetcher robot to pre-fetch includes operating the fetcher robot to pre-fetch, from the archival storage racks to the buffer rack, one or more data storage media containing data requested by the read request.

5. The computer-implemented method of claim 1, further comprising scheduling to operate the buffer robot to move the second data storage medium from the I/O drive to a return slot in the buffer rack, in response to completing the I/O operation on the second data storage medium.

6. The computer-implemented method of claim 5, further comprising operating the fetcher robot to move the second data storage medium from the return slot in the buffer rack to the archival storage racks.

7. A cold storage system, comprising:
   a buffer rack adapted to physically store data storage media;
   an input/output (I/O) drive in or coupled to the buffer rack;
   a processor configured to process an I/O request to be fulfilled by the I/O drive, wherein the processor is configured to determine whether the I/O request involves a data size larger than a maximum data capacity of a single data storage medium in the buffer rack and, in an event the I/O request involves a data size larger than the maximum data capacity of a single data storage medium, operate a buffer robot configured to move along the buffer rack, including to and from the I/O drive;
   one or more archival storage racks adapted to physically store multiple data storage media; and
   a fetcher robot configured to move among at least the buffer rack and the archival storage racks.

8. The cold storage system of claim 7, wherein the data storage media in the buffer rack and the archival storage racks include optical discs.

9. The cold storage system of claim 7, wherein the archival storage racks are adapted to store the multiple data storage media in one or more media containers.

10. The cold storage system of claim 7, wherein the I/O drive is closer to the buffer rack than any of the archival storage racks.

11. The cold storage system of claim 7, wherein the I/O drive is attached to the center of the buffer rack.

12. The cold storage system of claim 7, wherein the buffer rack is adapted to store multiple types of data storage media and the I/O drive is adapted to read from or write in the multiple types of data storage media.

13. The cold storage system of claim 7, wherein the fetcher robot is configured to fetch a blank data storage medium from the archival storage racks to the buffer rack when the I/O request involves a write request and the I/O drive has not yet completed the write request.

14. The cold storage system of claim 7, wherein the I/O request is a write request; wherein the buffer robot is configured to load, from the buffer rack to the I/O drive, one blank data storage medium after another, to fulfill the write request requiring storage capacity of multiple storage media; and wherein the fetcher robot is configured to pre-fetch a blank data storage medium from the archival storage racks to a slot in the buffer rack while the buffer robot is loading another data storage medium or the I/O drive is accessing another data storage medium.

15. The cold storage system of claim 7, wherein the I/O request is a read request; wherein the buffer robot is configured to load, from the buffer rack to the I/O drive, one requested data storage medium after another, to fulfill the read request involving multiple storage media; and wherein the fetcher robot is configured to pre-fetch, from the archival storage racks to a slot in the buffer rack, a storage media container containing at least a data storage medium storing data requested by the read request, while the buffer robot is loading another data storage medium or the I/O drive is accessing another data storage medium.

16. The cold storage system of claim 7, wherein the processor is configured to designate a return slot in the buffer rack whose content is to be returned to the archival storage racks; and wherein the fetcher robot is configured to remove the content in the return slot.

17. The cold storage system of claim 16, wherein the processor is configured to designate the return slot after a data storage medium is removed, by the buffer robot, from the I/O drive to the return slot.

18. A computer-readable storage memory storing computer-executable instructions, comprising:
  instructions for receiving an input/output (I/O) request at a cold storage system having a buffer rack and one or more archival storage racks, wherein the buffer rack is closer to an I/O drive of the cold storage system than the archival storage racks;
  instructions for determining whether the I/O request involves a data size larger than a maximum data capacity of a single data storage medium in the buffer rack and, in an event the I/O request involves a data size larger than the maximum data capacity of a single data storage medium, commanding a fetcher robot to pre-fetch a first data storage medium from the archival storage racks to the buffer rack;
  instructions for commanding a buffer robot to move a second data storage medium from a slot in the buffer rack to the I/O drive, wherein the slot is in an area in the buffer rack designated to store one or more data storage media associated with a pending I/O operation; and
  instructions for executing, according to the I/O request, an I/O operation on the second data storage medium at the I/O drive.

* * * * *